United States Patent [19]
Griffith

[11] Patent Number: 5,291,972
[45] Date of Patent: Mar. 8, 1994

[54] METHOD FOR LOCKING A HAND OPERATED BRAKE LEVER IN ITS APPLIED POSITION

[76] Inventor: Robert C. Griffith, 21209 Dumetz Rd., Woodland Hills, Calif. 91364

[21] Appl. No.: 562,558

[22] Filed: Jul. 26, 1990

[51] Int. Cl.⁵ .................................. B62L 3/06
[52] U.S. Cl. ........................... 188/24.18; 74/489; 188/83; 188/265; 280/288.4
[58] Field of Search ............... 188/24.11-24.28, 188/265, 83; 74/489, 519, 523, 526, 594.6, 594.4; 24/31 V, 306, 450, 442, 16 R; 446/369; 70/233; 280/288.4; 2/311, 312, 338

[56] References Cited

U.S. PATENT DOCUMENTS

| | | | |
|---|---|---|---|
| 677,907 | 7/1905 | Vandeleur | 70/233 |
| 2,472,442 | 6/1969 | Schueler | 74/489 |
| 3,800,618 | 4/1974 | Yoshigai | 74/489 |
| 3,835,724 | 9/1974 | Hoffman | 74/489 |
| 3,947,927 | 4/1976 | Rosenthal | 24/16 R X |
| 3,948,361 | 4/1976 | Carlson | 74/489 X |
| 4,200,005 | 4/1980 | Mohr | 74/594.6 |
| 4,203,233 | 5/1980 | Crane | 446/369 X |
| 4,273,130 | 6/1981 | Simpson | 24/442 X |
| 4,361,972 | 12/1982 | Miller | 74/594.6 X |
| 4,426,861 | 1/1984 | Chillis | 70/233 X |
| 4,442,732 | 4/1984 | Okajima | 74/594.6 X |
| 4,603,875 | 8/1986 | Boughton et al. | 188/24.18 X |
| 4,653,613 | 3/1987 | Blancas | 74/489 X |
| 4,759,963 | 7/1988 | Uso, Jr. et al. | 24/442 X |
| 4,807,372 | 2/1989 | McCall | 74/594.6 X |
| 4,811,765 | 3/1989 | Giha | 74/526 X |
| 4,856,211 | 8/1989 | Phillips | 74/594.6 X |
| 4,862,563 | 9/1989 | Flynn | 24/31 V X |
| 4,874,151 | 10/1989 | Fritz | 74/526 X |
| 4,878,274 | 11/1989 | Patricy | 24/306 |
| 4,939,818 | 7/1990 | Hahn | 24/442 X |
| 5,142,743 | 9/1992 | Hahn | 24/16 R |
| 5,168,603 | 12/1992 | Reed | 24/306 X |

FOREIGN PATENT DOCUMENTS 0222428 10/1942 Switzerland ............... 188/24.18

OTHER PUBLICATIONS

Bicycling Magazine's Complete Guide To Bicycle Maintenance and Repair, Rudale Press, Emmaus, Pennsylvania, 1986, pp. 200–206.
Catalog By Performance Bicycler, Early Spring 1992 (entire catalog).
Contak article, Nov. 1985, pp. 1–3.

*Primary Examiner*—Douglas C. Butler
*Attorney, Agent, or Firm*—Daniel L. Dawes

[57] ABSTRACT

A removable brake locking device for a hand-operated brake lever on a bicycle in its brake actuating position is provided and can be used with only one hand. The device is an nonextendible strap having a loop arranged and configured to be disposed around a handlebar to which the brake lever is attached. File strap has a linear free end extending from the loop which is then snugly pulled over the lever and attached to the loop to cause or to retain the brake lever in a closed or actuated configuration. The bicycle wheel couple to the corresponding brake is locked and the bicycle can be leaned against a vertical support without the likelihood of its turning and falling.

5 Claims, 1 Drawing Sheet

METHOD FOR LOCKING A HAND OPERATED BRAKE LEVER IN ITS APPLIED POSITION

BACKGROUND OF THE INVENTION

1. Field of the Invention

This invention relates to a brake locking device useful with a conventional brake of a vehicle such as a bicycle, normally having a hand brake mounted on a handlebar assembly of the vehicle.

2. Description of the prior art.

Generally, in two-wheeled vehicles, conventionally steered by a handlebar assembly, as in bicycles, it is quite common to have a hand brake operatively mounted on the handlebar assembly in the area of at least one of the hand grips on the handlebar. Normally, such a hand brake comprises a lever which is pivotally mounted on the handlebar assembly in the area of at least one of the hand grips, so that the operator of the vehicle can conveniently grasp and compress the brake lever toward the hand grip of the handlebar assembly in order to engage or operate the brake.

Normally, hand brakes on vehicles such as bicycles, have not included a means to maintain a brake in a locked or engaged position when the vehicle is in the stopped condition and when left unattended by the operator.

Without such a locking mechanism it is easy for the front wheel of the bike to turn and, if the front wheel is unlocked, the bike will roll out under the front wheel and fall.

Two basic reasons as to why vehicles such as bicycles have not used such locking devices are excessive cost and interference of the normal service operation of the brake.

One prior art solution has been to provide a clip which is clipped between the body frame of the bicycle and the wheel. Such clips are not available for mountain bikes because the clearance between the body frame and the wheel is too great and the clips do not fit. Larger clips for mountain bikes are not currently available and, even if they were, their size would cause them to be bulky and unwieldy for practical use.

Other attempts to solve this problem can be seen in Schueler, U.S. Pat. No. 2,472,442; Carlson, U.S. Pat. No. 3,948,361; Yoshigai, U,S, Pat. No. 3,800,618; and Blancas, U.S. Pat. No. 4,653,613. However all of these attempts involved complicated and expensive mechanisms integrally formed and manufactured with the braking apparatus itself the excessive cost of such devices and their interference with normal service operation of the brakes are reasons why such devices are not in widespread use.

BRIEF SUMMARY OF THE INVENTION

In view of the forgoing, it is an object of this invention to provide an inexpensive device for locking a hand operated brake in its applied position.

It is also an object of this invention to provide such a brake locking device which does not interfere with the normal service operation of the brake.

It is a further object of this invention to provide such a device which can be removed when not in use.

It is a further object of this invention to provide such a brake locking device which is lightweight, portable, and unobtrusive.

It is a further object of this invention to provide such a brake locking device which is attractive.

It is a further, and main, object of this invention to provide a brake locking device that is of such simplicity that it can be operated with one hand.

Further purposes and objects of this invention will appear as the specification proceeds.

The foregoing objects are accomplished by providing a strap with a first end portion which can be easily fixed to the handlebar of a bicycle and a second end portion which is tightly wrapped around the brake lever to secure the lever is in its brake actuating position by fastening the loose second end portion of the strap to the fixed first end portion of the strap.

The invention is employed in combination with a wheeled vehicle with a manual brake with an actuating mechanism for locking at least one wheel. The invention is a brake locking device attached at least in part to a handlebar comprising a strap having a length sufficient to wrap around the handlebar and the actuating mechanism to form a temporarily closed loop around the actuating mechanism. The strap has a free end portion and an opposing fixed end portion. A fixation element fixes the fixed end portion of the strap to the handlebar. A fastening element securely fastens the free other end portion to the fixed end portion after the strap is closely wrapped around the actuating mechanism to apply a compressive force thereto. The compressive force disposes the actuating mechanism into an actuated configuration to lock the at least one wheel.

The fixation element comprises a loop of slightly larger circumference than the circumference of the handlebar formed in the fixed end so that the loop is adapted to slide over the handlebar. The loop has a circumference which is adjustable to fit over the handlebar. One handlebar has an arbitrary outer diameter. The loop is formed by securing the end of the fixed end portion to another part of the end portion. The fastening element is arbitrarily adjustable The invention is also characterized as a brake locking device to actuate a brake lever attached to a handlebar comprising a looped portion having an inner circumference slightly larger than the outer circumference of the handlebar so that the looped portion is adapted to closely slide over the handlebar. A strap is integrally formed with and extending from the looped portion. The strap has a free end. The strap is of sufficient length such that the free end contacts the looped portion if the strap is closely wrapped around the lever when the lever is in its brake actuating position while the looped portion is on the handlebar. A fastening element securely fastens the free end to the looped portion when the looped portion is on the handlebar and when the strap engages the lever in the brake actuating position. The strap is a flexible body of material, namely fabric.

The invention is further characterized as an improvement in a hand operated, handlebar-mounted brake lever having a brake-engaging position comprising an element for fixing one end portion of a strap to the handlebar. An element is provided for depressing the lever into its the brake-engaging position. Another element is provided for securely fastening the free other end portion of the strap to the fixed end portion.

The invention is also a method of maintaining a hand-operated, handlebarmounted brake lever in its brake-engaging position comprising the steps of fixing one end portion of a strap to the handlebar. The lever is depressed by the strap into its the brake-engaging position.

The strap is closely wrapped around the lever in its brake-engaging position. The free other end portion of the strap is securely fastened to the fixed end portion.

Each of the steps is performed manually with one hand in a series of consecutively performed steps without changing hands.

The invention is better visualized by now turning to the following drawings wherein like elements are referenced by like numerals.

Figure 1:
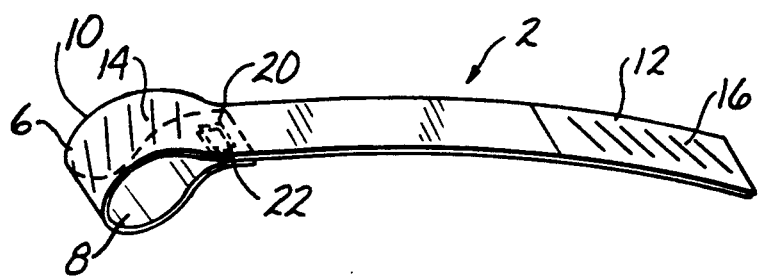
FIG. 1 is a top perspective view of the invention.
Figure 2:
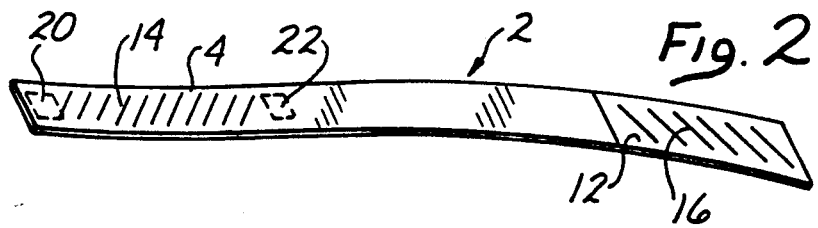
FIG. 2 is a top perspective view of the invention prior to the creation of the loop.

The invention can be better understood by viewing the drawings in light of the following detailed description.

DETAILED DESCRIPTION OF THE PREFERRED EMBODIMENTS

A removable brake locking device for a hand-operated brake lever on a bicycle in its brake actuating position is provided and can be used with only one hand. The device is an nonextendible strap having a loop arranged and configured to be disposed around a handlebar to which the brake lever is attached. The strap has a linear free end extending from the loop which is then snugly pulled over the lever and attached to the loop to cause or to retain the brake lever in a closed or actuated configuration. The bicycle wheel couple to the corresponding brake is locked and the bicycle can be leaned against a vertical support without the likelihood of its turning and falling.

This invention is a strap 2 with two end portions. The first end portion 4 of the strap 2 has fixation means for fixing strap 2 on a handlebar 30. In its preferred embodiment, the fixation means is a loop 6 which is formed to fit around the circumference of handlebar 30 and slide thereon. When placed on handlebar 30, strap 2 becomes radially, but not axially fixed, with respect to said handlebar 30.

In its preferred embodiment, loop 6 is permanently formed by securing end 20 to part 22 of fixed end portion 4. Loop 6 is manufactured to easily slide over a standard sized handlebar. It is clear that strap 2 could be made without a permanently formed loop, but instead contain adjustable securing means to selectively secure end 20 to any one of a plurality of points along fixed end portion 4, thereby allowing the user to create a loop of any desired size.

Loop 6 has an inner side 8 which contacts handlebar 30 when slid thereon, and an outer side 10 which includes fastening means for fastening the free other end of strap 2 to loop 6. In the preferred embodiment, fastening means comprise mating Velcro strips 14, 16 being formed on the outer side 10 of loop 6 and opposing end 12.

Figure 3:
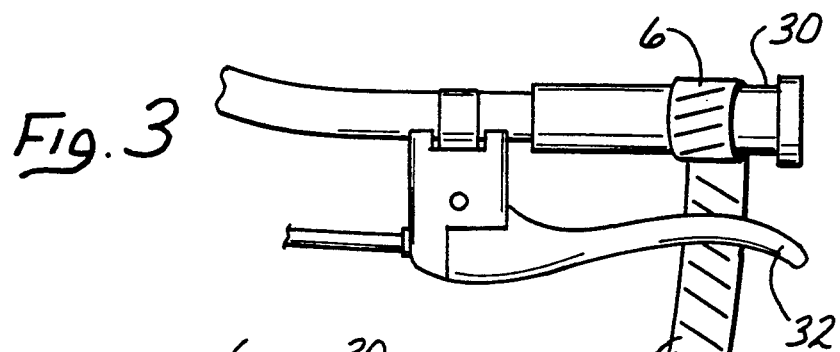
FIG. 3 is a perspective view of the invention in its inoperative state on a handlebar with a brake lever in the nonactuated position.
Figure 4:
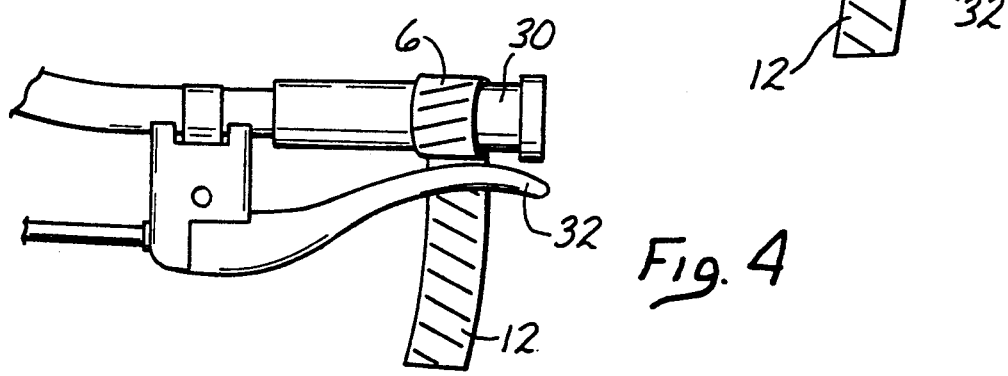
FIG. 4 is a perspective view of the invention in its inoperative state on a handlebar with a brake lever in an actuated position.
Figure 5:
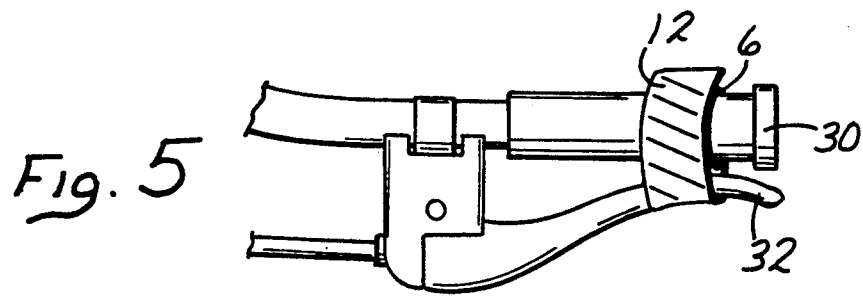
FIG. 5 is a perspective view of the invention in its operative state on a handlebar with a brake lever in an actuated position.

The method of using strap 2 is shown in FIGS. 3–5.

In FIG. 3, loop 6 is slid onto handlebar 30 in a position whereby free end portion 12 of strap 2 hangs loosely along side brake lever 32. Brake lever 32 is then put into its brake actuating or closed position, shown in FIG. 4 by squeezing lever 32 toward handlebar 30. Finally, as shown in FIG. 5, free end portion 12 of strap 2 is tightly wrapped around brake lever 32 and fastened to loop 6 by mating the Velcro fasteners 14, 16. Lever 32 is thereby locked in its brake actuating or closed position until the Velcro fasteners 14, 16 are released by the user.

It can now be appreciated that with very little dexterity and practice a user can place strap 2 on handlebar 30, squeeze brake lever 32 closed and bind lever 32 into the closed position by drawing end 12 over it with the use of one hand. The other hand will typically be used to hold the bicycle in an upright position while the brake is being locked on. Thereafter, the cyclist can lean his bike against an object without the almost inevitable consequence of dropping the bicycle on the ground as is the case with bicycles not equipped with the present invention.

Many modifications and alterations may be made by those having ordinary skill in the art without departing from the spirit and scope of the invention. Therefore, it must be understood that the illustrated embodiment has been set forth only for the purposes of example and clarity and should not be read as limiting the invention as defined in the following claims. The invention as claimed expressly includes not only the literal elements claimed and equivalents thereto, but all combinations or elements which friction in any manner to obtain the same result.

I claim:

1. A method of maintaining a hand-operated, handlebar-mounted brake lever in its brake-engaging position comprising the steps of:
    fixing one end portion of a strap to said handlebar by looping a fixed closed loop of said strap over said handlebar with one hand;
    depressing said lever into its said brake-engaging position with said strap with said one hand;
    closely wrapping said strap around said lever in its brake-engaging position with said one hand; and
    securely fastening the free other end portion of said strap to said fixed end portion with said one hand.

2. The method of claim 1 wherein said step of fixing one end portion of a strap to said handlebar is accomplished by forming a loop of slightly larger circumference than the circumference of said handlebar so that said loop is adapted to closely slide over said handlebar.

3. The method of claim 2 wherein said step of securely fastening the free other end portion of said strap to said fixed end portion is arbitrarily adjustable.

4. The method of claim 2 wherein said step of forming said loop si accomplished by securing the end of said fixed end portion to another part of said end portion.

5. The method of claim 1 wherein said step of securely fastening the free other end portion of said strap to said fixed end portion is arbitrarily adjustable.

* * * * *